Dec. 14, 1954     J. W. McELGIN     2,696,948
AIR CONDITIONING SYSTEM
Filed April 29, 1950     3 Sheets-Sheet 1

INVENTOR
JOHN W. McELGIN
BY
Toulmin & Toulmin
ATTORNEYS.

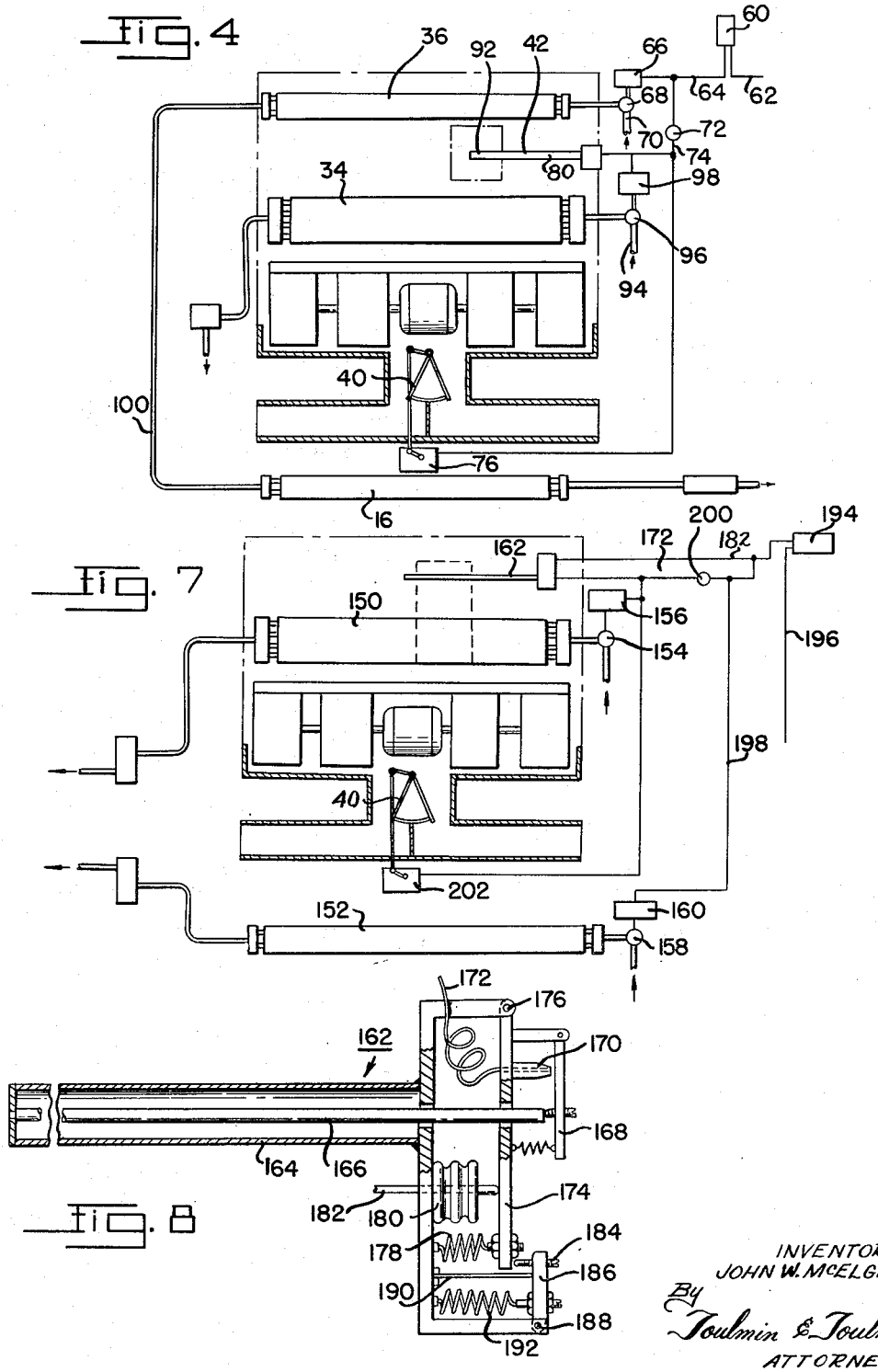

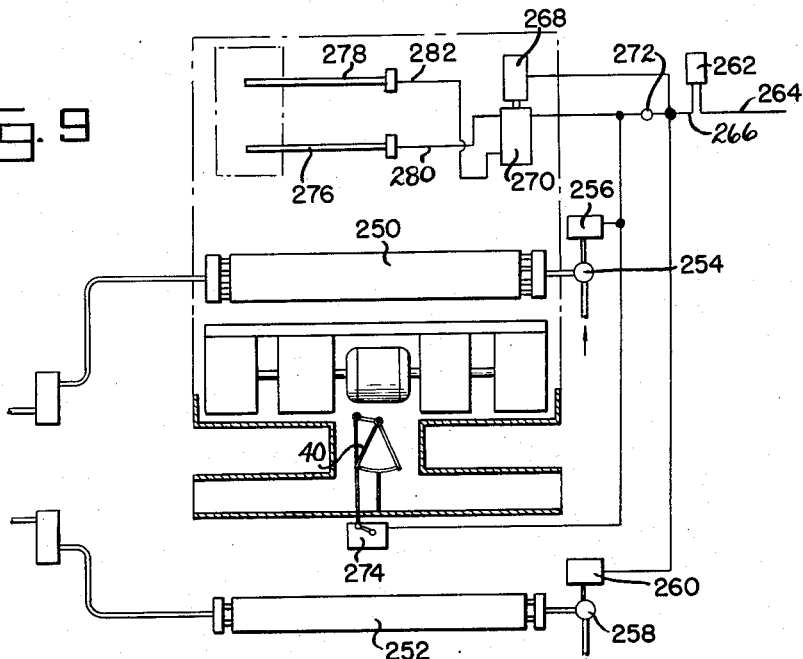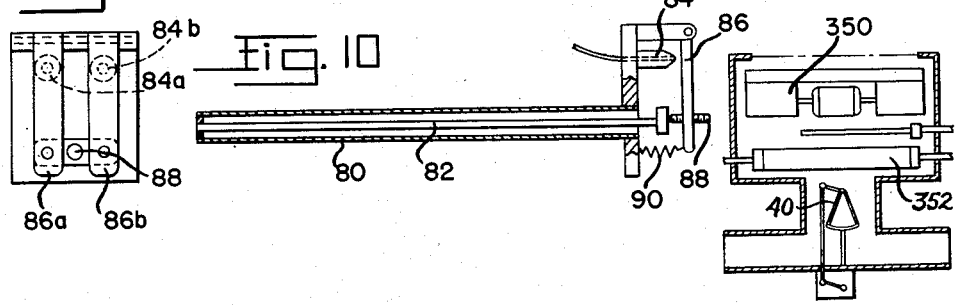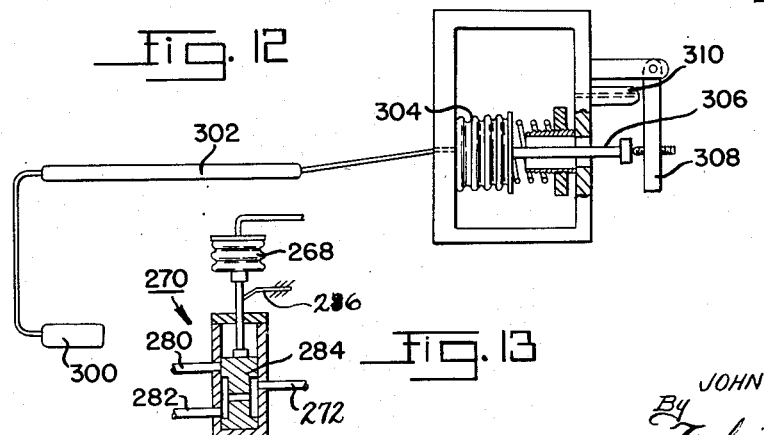

United States Patent Office 2,696,948
Patented Dec. 14, 1954

2,696,948

AIR CONDITIONING SYSTEM

John W. McElgin, Philadelphia, Pa., assignor to John J. Nesbitt, Inc., Philadelphia, Pa., a corporation of Pennsylvania Application April 29, 1950, Serial No. 159,009

12 Claims. (Cl. 236—37)

This invention relates to air conditioning systems, and particularly to a method and apparatus for air conditioning and to a control arrangement for controlling the operation of the system.

In the conditioning of the air in enclosures such as rooms, a common type of unit is one wherein both inside and outside air are blown through heating coils into the enclosure to be heated. By controlling the supply of the heating medium to the heating coils and by regulating the proportions in which the outside and inside air are admixed, the temperature of the enclosure can be regulated quite closely and a continuing supply of fresh air delivered thereto. In systems of this nature, the unit can supply a cooling effect to the enclosure when the heating medium is cut off and the supply of outside air continued. The unit thus acts on both heating and heater-off cycles for maintaining the temperature of the enclosure substantially constant. Also, at one point in the regulation of a unit of this type, the unit merely recirculates air at no change in temperature. At this time, as far as the conditioning of the air is concerned, the unit is operating on what might be termed "idle cycle."

Units of the type referred to above and controls therefor are illustrated in my issued Patents, 2,216,350, granted October 1, 1940; 2,268,048, granted December 30, 1941; 2,286,749, granted June 16, 1942; and 2,290,985, granted July 28, 1942.

Air conditioning units of the type illustrated in those patents and controlled by the control arrangements shown therein have proved to be highly satisfactory so far as regulating the temperature of the entire enclosure. However, in certain instances, notably in school classrooms and the like, at least one wall of the enclosure may consist principally of glass. A wall of this nature, especially when it becomes long as in modern classrooms which are sometimes upwards of fifty feet in length, can create cold drafts adjacent the wall even though the average temperature of the enclosure is maintained at the proper degree.

The air conditioning units referred to are small dimensionally relative to an enclosure which they are capable of conditioning. Thus, the supply of conditioning air from the units is necessarily discharged into the enclosure from a relatively small location therein. The cold drafts resulting from the windows can be offset to a certain extent by employing a number of the units spaced along the windowed wall but this is not generally practical because a great deal more conditioning capacity will be embodied in such an installation than is necessary.

One way in which the above mentioned cold drafts can be counteracted consists of placing an auxiliary convector, or radiator, along the wall, or distributing convector units along the said wall which will supply heat to the atmosphere and thus offset the cold drafts. Convectors of this type do not employ fans or blowers but operate purely on the convection principle for supplying the additional heat.

In attempting to organize an air conditioning system including one or more conditioning units having blowers and auxiliary convector units without blowers, certain difficulties arise which tend to defeat the purpose of the system. For example, if the heating medium to the auxiliary convectors is so controlled that it is interrupted prior to the interrupting of the supplying of heating medium to the conditioning unit, then the auxiliary convectors will merely act as an aid in the initial warming up of the enclosure, and thereafter substantially the entire load will be carried by the conditioning unit, thus leaving the auxiliary convectors substantially idle. Under these conditions, the same cold drafts referred to previously will be present.

On the other hand, if the control system is so arranged that the supply of heating medium to the conditioning unit is interrupted before the supply is interrupted to the convectors, the conditioning unit will tend to go over to its heater-off cycle and the situation will arise where the convectors are supplying heat to the enclosure and the conditioning unit is supplying cooling air. Under these circumstances, the conditioning unit and the convectors work in opposition and an inefficient and faulty cycle obtains.

Having the foregoing in mind, it is a primary object of this invention to provide an arrangement whereby blower type conditioning units and auxiliary convectors can be combined for conditioning the air in an enclosure while operating on a stable cycle.

A particular object of this invention is to provide a combination of a blower type conditioning unit, together with convectors for conditioning the air in an enclosure such that the conditioning unit and convectors are prevented from ever operating in opposition.

A still further object is the provision of an air conditioning system for a room such as a school room or the like, which has a tendency toward cold drafts along an outside wall, such that the said drafts are completely offset and eliminated.

Another object of this invention is to arrange an air conditioning system as set forth above and a control system therefor in a practical and simple manner and one which is relatively inexpensive.

These and other objects and advantages will become more apparent upon reference to the following description taken in connection with the accompanying drawings in which:

Figure 1 is a perspective view showing an air conditioning installation according to this invention arranged along the outside wall of a building such as a classroom or the like.

Figure 4 is a diagrammatic layout of the air conditioning system of Figure 1 showing the control means associated therewith.

Figure 7 is a view similar to Figure 4 but showing how the objects of this invention can be obtained by means of a special control system which eliminates the need for a minor heating element in the conditioning unit.

Figure 8 is a sectional view showing the construction of the thermostat which is mounted in the unit of Figure 7 and including a delay feature forming an important part of the control system of Figure 7.

Figure 9 is a view similar to Figure 7 but showing still another manner in which the objects of this invention can be obtained by means of a specially adapted control system.

Figures 10 and 11 are side and end views, respectively, of a modified type of thermostat for placing in the control system of Figure 9 in place of the two thermostats illustrated as associated with the conditioning unit.

Figure 12 is a view showing a liquid type thermostat which is adapted for replacing any of the thermostats associated with the conditioning units.

Figure 13 is a sectional view showing the construction of a control valve that controls the operation of the dual thermostat arrangement of Figures 9 or 10; and Figure 14 is a view similar to Figures 4, 7 and 9 but showing how the fans of the unit can be located to draw air through the heating element by induced draft rather than to blow it through by forced draft.

Figure 1:
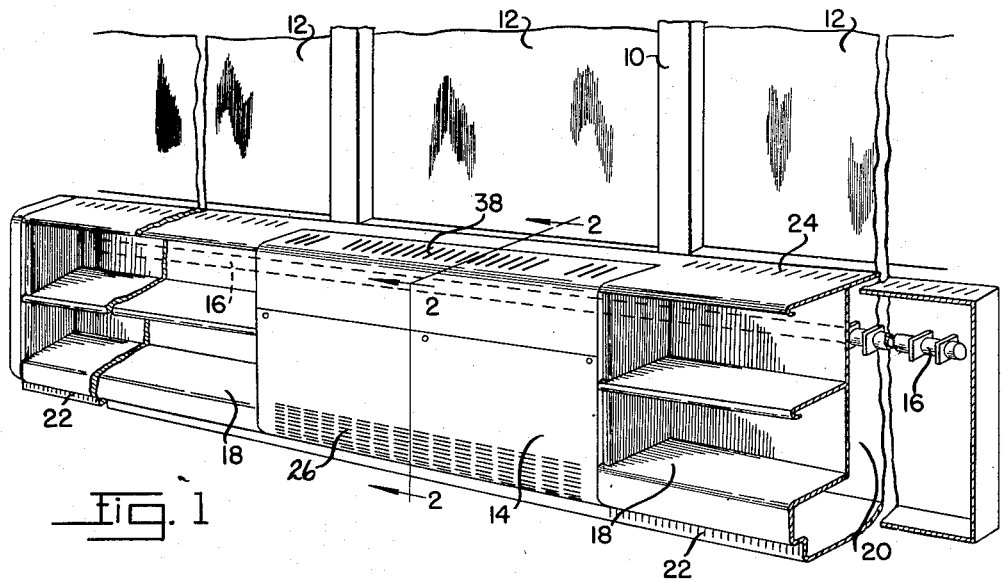
Figure 2:
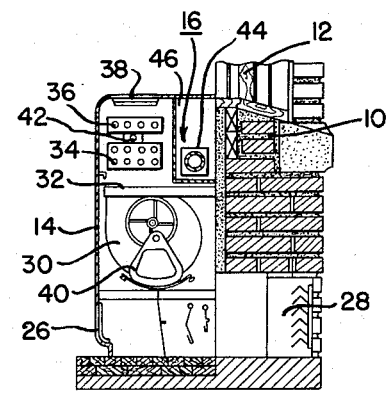
Figure 2 is a view of a transverse vertical section taken through the blower type conditioning unit and is indicated by line 2—2—2 on Figure 1.

Referring to the drawings somewhat more in detail, Figures 1 and 2 illustrate an enclosure having an outside wall 10 composed of a plurality of windows 12. Mounted along the wall beneath the windows is a conditioning arrangement according to this invention comprising one or more principal conditioning units as at 14 which comprise fans for blowing air through the units. The arrangement illustrated also comprises auxiliary convectors as at 16 and which extend along a substantially greater length of the wall 10 than does the unit or units 14.

A number of different arrangements of the convector or convectors 16 can be made but in Figure 1 the blower unit 14 is abutted on each side by the open cabinet structure 18 which comprises the space 20 extending across the bottom and up the back and in which the convector or convectors is mounted. The lower, forward part of the cabinets may be provided with the openings or grill work 22 which admit air to space 20, while the upper parts of the cabinets are similarly provided with the openings or grill work 24 through which the heated air may pass. It will be evident that the heated air issuing from the openings 24 will be highly effective for counteracting the cold drafts which move downwardly over the windows 12 thereover.

Figure 2 shows the unit 14 in section and it will be seen to comprise a casing having inlet openings 26 through which inside air is drawn into the unit, and an opening 28 through which outside air is drawn into the unit.

Fan means at 30 are provided and the air entering the unit through openings 26 and 28 is driven by the fan through its discharge opening 32 over a main heating element 34 and an auxiliary heating element 36 through the grill 38 in the top of the unit.

A roll damper 40 is provided which is movable for adjusting the proportions of air admitted through each of the openings 26 and 28 in accordance with practices fully explained and illustrated in connection with the several patents referred to above.

A thermostat 42 may be positioned as illustrated between the major and minor heating elements for controlling the supply of heating medium thereto, as will be more fully explained thereinafter.

In Figure 2 the auxiliary convector takes the form of finned pipe 44 that extends through the dead space 46 at the back of the unit.

Figure 3:
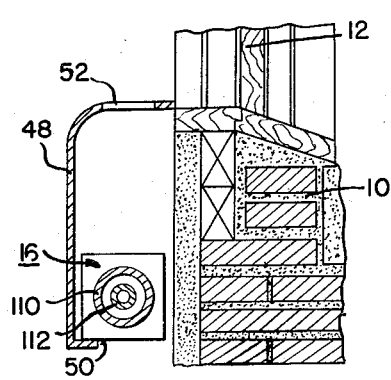
Figure 3 is a vertical sectional view taken through a modified arrangement of providing enclosures for the auxiliary convectors.

In Figure 3 the convector 16 is arranged along the wall 10 beneath the windows 12 and is shielded by relatively small hood member 48 open at the bottom as at 50 to admit the air to be heated and having openings at the top as at 52 for the discharge of the heated air.

Turning now to the control system of Figure 4, wherein the various parts of the conditioning system and the control system are identified by the same reference numerals employed in Figures 1 and 2, the control medium employed is fluid pressure obtained from a compressor and pressure tank as illustrated in my Patent No. 2,268,048, but it will be apparent that the control medium could be electricity, or a liquid medium such as hydraulic fluid, if so desired.

In Figure 4 there is a room thermostat at 60 and to which is supplied air pressure by conduit 62. Air discharges from the room thermostat 60, this arrangement being well known in the art and being such that if the temperature of the room or enclosure increases, the pressure in conduit 64 increases, whereas if the temperature decreases, the pressure in conduit 64 decreases.

Conduit 64 of Figure 4 is connected directly with valve operator 66 of control valve 68 of the minor heating element 36. Control valve 68 is located in conduit 70 that supplies steam or whatever heating medium is being employed to heating element 36. According to this invention, element 36 is relatively small and may consist of bare pipe or of pipe with a relatively small number of fins thereon so that the temperature rise encountered from main heating element 34 through the minor element is only in the neighborhood of 15 degrees Fahrenheit.

Conduit 64 is connected through restrictor 72 with a conduit 74 that has one branch leading to thermostat 42 and another branch leading to the damper operator 76. Damper operator 76 controls damper 40 in accordance with the particular type of heating cycle being employed. Normally, the damper is closed to the outside air until the temperature in the enclosure comes up to a predetermined point. Thereafter, the damper may move to admit all outside air, to admit a minimum quantity of outside air, or may be so controlled as to maintain a predetermined mixture of inside and outside air. The particular type of control exerted over the damper forms no part of this invention in itself.

The thermostat at 42 may be of the type illustrated in Figure 10 wherein there is an outer tube 80 within which there is mounted a rod 82 anchored in the tube at one end and free in the tube at the opposite end. The tube preferably has a high coefficient of expansion whereas the rod 82 preferably has a much lower coefficient of expansion. Suitable materials for these members are brass for the tube 80 and Invar or a ceramic material for the rod 82. In any event, the rod 82 will shift axially of the stationary end of the tube in response to temperature changes.

The branch of conduit 74 leading to the thermostat terminates in a jet or leak port 84 adapted for being variably restricted by pivoted plate 86 having an adjustable set screw 88 bearing on the end of rod 82. A spring 90 normally urges the plate toward the leak port.

The thermostat is preferably arranged with a portion of tube 80 exposed to the air passing from element 34 to element 36, and another portion, as at 92, exposed to the outdoor air entering the unit. The purpose of this is to compensate for changes in temperature of the outside air whereby uniform control of the temperature of the enclosure is obtained.

It will be evident that thermostat 42 operates to permit the exhaust of fluid from leak port 84 at a rate generally inversely proportional to the temperature to which the thermostat is exposed. When the rate of leakage from the port is high, there is a pressure drop on downstream side of restrictor 72 and when the rate of leakage is reduced, the pressure on the downstream side of the restrictor tends to approach the pressure standing on the upstream side.

The major heating element 34 is adapted for having heating medium supplied thereto through conduit 94 in which is located control valve 96 adapted for adjustment by operator 98 that is connected to receive pressure from conduit 94. In connection with both of the valves 68 and 96, they are normally urged toward a wide open position and are adapted for being closed by their respective operators 66 and 98 in response to increasing pressures in conduits 64 and 74, respectively.

In Figure 4, the heating medium discharged from element 36 is conveyed by conduit 100 to convector 16 to act as the heating medium for this element also. It will be apparent, however, that the elements 36 and 16 could be connected in parallel for being controlled by valve 68, or each could have its own individual control valve and fully equivalent results would obtain.

*Operation of the modification of Figures 1 through 4*

Let it be assumed that the enclosure to be heated is cold and that the conditioning system of this invention is placed in operation. Under these circumstances the damper 40 will be swung to cut off all air from the outside and the valves 68 and 96 will be wide open so that a maximum supply of heating medium will pass to the heating elements 34 and 36 and to convector 16. The enclosure is thus warmed up and as the temperature thereof increases, room thermostat 60 brings about an increase in pressure in conduit 64. This pressure is transmitted to the thermostat 42 and, when it reaches a certain value as determined by the throttling effect set up at the leak port of the thermostat, will cut off major heating element 34. At or prior to this time the damper 40 has moved to some intermediate position as determined by the type of cycle for which it is adjusted.

The conditions now obtained are that minor heating element 36 and convector 16 are both supplying heat to the enclosure. The purpose of having heating element 36 supply heat is that it prevents the unit 14 from having a cooling effect on the enclosure which would tend to counteract the heating effect of the convector 16. Also, by placing heating element 36 on the downstream side of thermostat 42, the heat supplied by the said element does not interfere with the operation of the thermostat so that major heating element 34 remains cut off when the room temperature approaches a predetermined point.

If the heat supplied by minor heating element 36 and convector 16 is sufficient to cause a further increase in the temperature of the enclosure, then heating element 36 and convector 16 are also cut off by closing of valve 68. Thereafter, the control of the system is the same as that which obtains in other systems with the thermostat 42 controlling the supply of heating medium.

From the foregoing, it will be apparent that the combination of the unit conditioner and ventilating unit and the convector are so controlled that they never operate in opposition and that the heater-off cycle of the conditioning unit obtains only when the convector is on its idle cycle. At any time that the convector is supplying heat to the room, heating element 36 is also receiving heating medium and is supplying heat to the room. This arrangement results in a very stable operation and at no time is there a loss of efficiency due to the unit and convector operating on contrary cycles.

Figure 5:
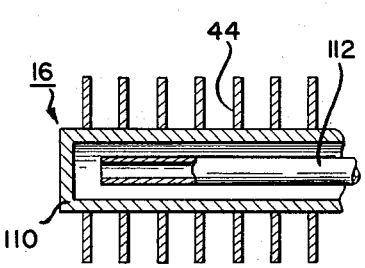
Figure 5 is a fragmentary view showing a modified form which the convector pipe can take, especially when the heating medium is steam.

The heating medium employed may comprise hot water or steam, and when steam is applied, the construction illustrated in Figure 5 for convector 16 may be employed to advantage. In this figure, the main convector pipe is at 110 and the steam supplied thereto is by means of a central pipe 112 which delivers the steam to the opposite outer ends of the convector, the condensate from the convector being drawn off from the center thereof. An advantage which is gained by this arrangement is that the heating of the enclosure by the convector comes from the ends of the room, rather than from the center part thereof to which heat is already being supplied by the conditioning unit 14.

Figure 6:
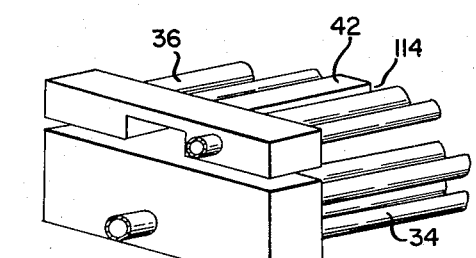
Figure 6 is a fragmentary perspective view showing one arrangement which can be made of the major and minor heating elements of the conditioning unit in relationship to each other and to the control thermostat of the unit.

Figure 6 illustrates an arrangement somewhat more compact than that illustrated in Figure 2 and wherein the minor heating element 36 is placed directly on top of major heating element 34 and with the center part of heating element 36 left open as at 114 for receiving thermostat 42. The thermostat may be suitably shielded against influence by the heat of minor element 36, and, under these circumstances, the same sort of operation obtains as with the construction of Figure 2.

Modifications of Figures 7 and 9

In the modification of Figures 1 through 4, the objects of this invention were obtained by the addition of an auxiliary heating element in the conditioning unit which remained in operation whenever the convector was in operation, whereby the conditioning unit was prevented from going on a heater-off cycle until the convector went on its idle cycle.

In the modifications of Figures 7 and 9, the objects of this invention are obtained without the use of the additional minor heating element in the conditioning unit, and, instead, the unit is prevented from going on a heater-off cycle while the convector is supplying heat to the room by special arrangements of the control system.

Making reference first to Figure 7, the major heating element therein is indicated at 150 and the convector at 152. Valve 154 having the operator 156 controls the supply of heating medium to element 150 while valve 158 having operator 160 controls the supply of heating medium to convector 152.

Positioned in the air stream leaving heating element 150 is a thermostat 162 which is illustrated more in detail in Figure 8. This thermostat has the conventional outer tube 164 and inner rod 166, the differential expansion of which adjusts a plate 168 in the manner already described to accomplish the variable throttling of leak port 170 connected with conduit 172.

In Figure 8, however, the leak port 170 and the pivot point for plate 168 are mounted on an arm 174 pivoted at 176. This arm is urged in a direction to decrease the restriction of leak port 170 by spring 178 and is adapted for being urged in the opposite direction by a bellows arrangement 180 connected with conduit 182.

The lower end of arm 174 is adapted for abutment with set screw 184 as the arm moves due to an increase in pressure in bellows 180. Set screw 184 is carried in an arm 186, pivoted at 188, and urged against a fixed stop rod 190 by a spring 192.

The thermostat of Figure 8 operates as follows:

When the enclosure is cold and the system is placed into operation, a minimum of restriction of leak port 170 obtains due to the contracted condition of tube 164 and this, together with the fact that the room thermostat is supplying a minimum pressure to conduit 172, results in a low control pressure that permits the heating medium supply valves to stand fully opened. As the temperature of the enclosure increases, and as tube 164 expands, arm 174 moves counter-clockwise about its pivot by the expansion of bellows 180 and plate 168 moves toward position to increase the throttling effect at the leak port 170. However, before the pressure in conduit 172 reaches the value which will cause the supply valve for the main heating element to close, the lower end of arm 174 abuts set screw 184. This will halt further movement of arm 174 until after a predetermined greater pressure rise takes place within the bellows 180. The amount of this pressure rise can be determined by adjustment of spring 192.

During the time that the pressure in bellows 180 is increasing due to the operation of the room thermostat as the temperature of the enclosure rises, the control valve for the convector is moving toward its closed position and this valve will become completely closed before the pressure in bellows 180 overcomes spring 192 and moves arm 194 to cause a pressure rise in conduit 172 that will close off the main heating element.

Turning again to Figure 7, the room thermostat referred to is indicated at 194 and pressure is supplied thereto through conduit 196, with the pressure supply from the thermostat going to conduit 182. A branch conduit 198 leads from conduit 182 to operator 160 on valve 158 and another branch in which restrictor 200 is mounted connects with conduit 172 leading to leak port 170, operator 156 of valve 154 and damper motor 202.

As an example of a typical schedule of pressures and temperatures which might obtain in connection with the modification of Figure 7, the thermostat 162 could be so adjusted that the pressure in conduit 182 could rise to 7 pounds per square inch in order to bring arm 174 against set screw 184. The throttling of leak port 170 at that time could be such that the heating element 150 would maintain the air discharge from the conditioning unit at, say, 80 degrees. This would remain constant until the pressure supplied to conduit 182 from the room thermostat reached a pressure of, say, 11 pounds per square inch. At this time the pressure in bellows 180 would overcome spring 192 and the restriction of leak port 170 would increase, thereby developing a high pressure at valve operator 156 and bringing about closing of valve 154 after a predetermined further pressure rise.

It will be evident from the foregoing that the arrangement of thermostat 162 is such that there is a hesitation in the closing of valve 154 as the temperature of the enclosure rises. During this period of hesitation, the control pressure in the pneumatic control system rises and will close off valve 158 of convector 152. In this manner the heating unit is prevented from going on a heater-off cycle while the convector is in operation. The convector thus carries its proper share of the conditioning load and is never operating in opposition with the conditioning unit.

In Figure 9 there is illustrated still another arrangement for controlling the operation of the combined unit ventilator and convector. In Figure 9 the unit ventilator has only a major heating element as indicated at 250 and the convector as indicated at 252. Valve 254 having operator 256 controls the supply of heating medium to the heating element 250 while valve 258 having the operator 260 controls the supply to the convector. The room thermostat is indicated at 262 and air is supplied thereto through conduit 264, the said air discharging from the thermostat through conduit 266. Conduit 266 has a branch line leading to valve operator 260 and another branch line leading to valve operator 268 of a control valve 270 to be described hereinafter.

Conduit 266 has still another branch leading through restrictor 272 to valve 270, to valve operator 256 and to damper operator 274.

In the modification of Figure 9, two thermostats are provided as indicated at 276 and 278. Each of these thermostats is of the standard leak type as illustrated in Figure 10 and which construction has already been explained in connection with the first modification of this invention. These thermostats are connected to valve 270 by conduits 280 and 282, respectively, and the said valve is operable for automatically selecting the one of the thermostats which is to be effective for exercising control over the operation of the conditioning system. The valve 270 and the operator therefor are shown in somewhat more detail in Figure 13. In Figure 13 it will be noted that valve 270 comprises a valve member 284 which will connect either one or the other of conduits 280 and 282 with the branch conduit connected with the downstream side of restrictor 272. Valve member 284 is normally biased toward one operative position and is adapted for being moved to its other operative position by a change in pressure in the operator 268. Means are provided for bringing about snap action of the valve member and may take the form of the spring indicated at 286. The valve is adjusted so as to shift from one operative position to the other on a relatively small pressure differential, say, 1 or 2 pounds per square inch.

The operation of the system of Figure 9 is as follows:

During the time that the enclosure being heated has come up to temperature, one of the thermostats 276 and 278 is in control of the system due to the position occupied by valve member 284 of valve 270. This thermostat is set for some predetermined temperature range which may be, for example, 75 to 80 degrees Fahrenheit. With this thermostat in control of the system when the temperature in the enclosure approaches the value for which the thermostat that is effective is adjusted, the control valve 254 of heating element 250 will close.

Following this, if no adjustments are made in the thermostat control, the ventilating unit will go on a cooling cycle and thus oppose the action of convector 252. However, at substantially the same pressure at which valve 254 is closed by its operator 256, operator 258 actuates valve member 284 of valve 270 to its other position thereby making the other one of thermostats 276 and 278 effective. This other thermostat is set for a substantially lower control temperature, for example, 60 degrees, and this will bring about a change in pressure in the control air lines to the operators 256 and 274 thereby preventing the ventilating unit from going on a cooling cycle until the temperature of the enclosure reaches a substantially greater amount.

The pressure at which valve 270 is shifted may be on the order of 7 pounds per square inch and after the valve is shifted the ventilating unit is prevented from going on a cooling cycle until the control pressure reaches a value of 11 pounds per square inch. During the time that the control pressure is increased from 7 pounds to 11 pounds, valve 258 is being closed by is operator so that by the time the ventilating unit actually changes over to a cooling cycle, the supply of heating medium to the convector is completely cut off. It will be evident that the organization of Figure 9 also achieves the objects of this invention by preventing the ventilating unit and the convector from ever operating in opposition.

The two thermostats 276 and 278 may advantageously be built into a single unit as illustrated in Figure 10 wherein the rod 82 is adapted for actuating plate 86 which may either be a single plate as described in connection with Figure 4 and which may be a double plate as indicated at 86a and 86b in Figure 11. When two plates are employed each may control a different jet as at 84a and 84b.

The thermostats which have been described in connection with the several modifications of this invention are all adapted for being partly disposed in the incoming outdoor air stream and partly disposed in the heated stream of air from the major heating element. Figure 12 shows a fluid pressure type thermostat wherein bulb 300 may be positioned in the outdoor stream and 302 positioned in the heated air stream. The pressure generated acts through bellows 304 to actuate rod 306 for shifting plate 308 that controls jet 310. The thermostat construction of Figure 12 is adapted for inclusion in any of the systems described.

All of the systems described up to this point are of the blow-through type wherein the blast of air through the ventilating unit is forced through by blower means on the upstream side of the heating element. However, this invention is also adapted for being practiced in connection with a draw-through type unit such as is illustrated in Figure 14 where the blower means 350 is positioned on the downstream side of heating element 352. It will be evident that all the features described in connection with this invention would be perfectly adaptable to the type of unit indicated in Figure 14.

I claim:

1. In an air conditioning system, a main conditioning unit having a blower and vertically spaced major and minor heating elements, an auxiliary unit comprising a convection heating element positioned apart from said main unit, means for conducting a supply of heating medium to said heating elements including a separate conductor for said major unit and a common conductor for said minor and auxiliary units, means for controlling the supply of heating medium in each of said conductors comprising a first thermostatic means positioned apart from said main unit and responsive to rises in temperature to decrease the supply to said units, a second thermostatic means positioned in said main unit and responsive to rises in temperature for interrupting said supply to said major element at a predetermined temperature rise, said first thermostatic means interrupting the supply in said common conductor upon a further temperature rise subsequent to interruption of said major unit.

2. In an air conditioning system, a main conditioning unit having a blower and vertically spaced major and minor heating elements, an auxiliary unit comprising a convection heating element positioned apart from said main unit, means for conducting a supply of heating medium to said heating elements including a separate conductor for said major unit and a common conductor for said minor and auxiliary units, valve means in each of said conductors, means for controlling the supply of heating medium in each of said conductors comprising a first thermostatic means positioned apart from said main unit and responsive to rises in temperature to partially close said valves, a second thermostatic means positioned in said main unit and responsive to rises in temperature for completely closing the valve in said separate conductor at a predetermined temperature rise, said first thermostatic means completely closing the valve in said common conductor upon a further temperature rise subsequent to closure of said separate conductor valve.

3. In an air conditioning system for an enclosure having windows therein, a main conditioning unit having a blower and vertically spaced major and minor heating elements, an auxiliary unit having an elongated convection heating element adapted for being positioned on either side of said main unit and beneath said windows, means for supplying heating medium to said major and minor heating elements, means for conducting said heating medium from said minor element to said auxiliary unit, valve means for controlling the supply of heating medium to each of said main heating units comprising first thermostatic means in said enclosure positioned apart from said main unit and responsive to rises in temperature to decrease the supply to said main units, second thermostatic means positioned in said main unit and responsive to rises in temperature for interrupting said supply to said major element at a predetermined temperature rise, said first thermostatic means interrupting the supply to said minor and auxiliary units upon a further temperature rise subsequent to interruption of the supply to said major unit.

4. In an air conditioning system for an enclosure having windows therein, a main conditioning unit having a blower and vertically spaced major and minor heating elements, said minor element being of a smaller capacity than said major unit, auxiliary units comprising elongated convection heating elements adapted for positioning beneath the windows of said enclosure on either side of said main unit, a common supply of heating medium for said major and minor units and means for conducting said medium thereto, said auxiliary units being connected in series with said minor element for common flow of heating medium therethrough, means for controlling the supply of heating medium to said units comprising a first thermostatic means located in said enclosure apart from said main unit and responsive to rises in temperature to decrease said supply, a second thermostatic means positioned in said main unit and responsive to rises in temperature for interrupting said supply to main major unit only at a predetermined maximum temperature, said first thermostatic means being operative to interrupt said supply to said minor and auxiliary units only after interruption of the supply to said major unit and upon a temperature rise above said predetermined maximum.

5. In an air conditioning system, a main conditioning unit having a blower and vertically spaced major and minor heating elements, an auxiliary unit comprising an elongated convection heating element, means for supplying heating medium to said main heating units comprising a common source for said medium and including valves at the inlets to said main units, means for conducting heating medium from said minor unit to said auxiliary unit whereby the heating cycles of said minor and auxiliary units will be in exact synchronism, pressure means for opening and closing said valves, a first thermostatic means spaced a substantial distance from said main unit for controlling said pressure means, a second thermostatic means connected to said pressure means and positioned adjacent said major element for actuation thereby, said second thermostatic means operable to close the valve to said major unit only on a predetermined temperature rise thereof, said first thermostatic means operable to close the valve to said minor element upon a rise in temperature beyond said predetermined temperature.

6. The combination of claim 5 wherein said second thermostatic means comprises a leak port connected to said pressure means and a bimetallic element extending in the heated area above said major unit, said bimetallic element being operable on expansion thereof for closing said port.

7. The combination of claim 1 wherein said minor and auxiliary units are connected in series to said common conductor.

8. The combination of claim 1 wherein said minor and auxiliary units are connected in parallel to said common conductor.

9. The combination of claim 1 wherein said second thermostatic means comprises a leak port and a bimetallic element positioned in said main unit above said major element and operable on temperature rise to close said port.

10. The combination of claim 1 wherein said second thermostatic means comprises a leak port and a pair of fluid pressure generating bulbs, one of said bulbs being positioned in an outdoor air stream and the other of said bulbs being positioned in said main unit above said major element and bellows means for closing said port upon a rise of pressure generated by said bulbs.

11. The combination of claim 1 wherein said blower is positioned beneath said heating elements and acts to force air upwardly toward said elements.

12. The combination of claim 1 wherein said blower is positioned above said heating elements and acts to draw air upwardly through said elements.

References Cited in the file of this patent

UNITED STATES PATENTS

| Number | Name | Date |
|---|---|---|
| 961,734 | Powers | June 14, 1910 |
| 1,913,681 | Otis | June 13, 1933 |
| 1,914,712 | Ewald | June 20, 1933 |
| 1,928,737 | Otto | Oct. 3, 1933 |
| 1,941,314 | Otto | Dec. 26, 1933 |
| 1,941,315 | Ward | Dec. 26, 1933 |
| 2,076,399 | Carson | Apr. 6, 1937 |
| 2,205,349 | Dube | June 18, 1940 |
| 2,268,048 | McElgin | Dec. 30, 1941 |
| 2,411,295 | Saballus | Nov. 19, 1946 |